United States Patent
Cass et al.

(10) Patent No.: US 6,189,313 B1
(45) Date of Patent: Feb. 20, 2001

(54) AIRCRAFT ENGINE FUEL SYSTEM MOUNTING ASSEMBLY

(75) Inventors: Michael Andrew Cass; Keith Everett Short, both of Rockford, IL (US)

(73) Assignee: Hamilton Sundstrand Corporation, Rockford, IL (US)

( * ) Notice: Under 35 U.S.C. 154(b), the term of this patent shall be extended for 0 days.

(21) Appl. No.: 09/292,681

(22) Filed: Apr. 16, 1999

(51) Int. Cl.$^7$ ...................................................... F02C 7/224
(52) U.S. Cl. ............................... 60/39.31; 60/734; 60/736
(58) Field of Search .............................. 60/39.31, 39.83, 60/734, 736, 739

(56) References Cited

U.S. PATENT DOCUMENTS

| 4,082,324 |   | 4/1978  | Obrecht . |          |
|-----------|---|---------|-----------|----------|
| 4,104,873 |   | 8/1978  | Coffinberry . |      |
| 4,245,964 | * | 1/1981  | Rannenberg | 60/734 |
| 4,498,693 |   | 2/1985  | Schindele . |        |
| 4,646,774 | * | 3/1987  | Hansen    | 60/736  |
| 4,740,018 |   | 4/1988  | Kenmochi . |        |
| 5,090,740 |   | 2/1992  | Creager . |          |
| 5,159,808 | * | 11/1992 | Kast      | 60/734  |
| 5,203,174 |   | 4/1993  | Meyer .   |          |
| 5,203,384 |   | 4/1993  | Hansen .  |          |

\* cited by examiner

*Primary Examiner*—Louis J. Casaregola
(74) *Attorney, Agent, or Firm*—Antonelli Terry Stout & Kraus

(57) ABSTRACT

An aircraft engine assembly includes an engine, an engine control actuator responsive to flow of high pressure fuel therethrough for actuating engine controls, a fuel heat exchanger for heating fuel, a fuel controller for controlling flow of fuel in the aircraft engine assembly, a fuel pump having a low pressure section for pressurizing the fuel to a low pressure, and a high pressure section for pressurizing the fuel to a high pressure, an engine gearbox, a seal plate, and a manifold mounted on the engine gearbox and having the fuel pump and the fuel controller mounted thereon, with the seal plate between the fuel pump and fuel controller and the manifold. The manifold provides fuel flow paths between the fuel pump and fuel controller and the several other components of the aircraft engine assembly, replacing the several pipe connections of the prior art. Therefore, it is not necessary to disconnect and reconnect the several pipe connections when removing and reinstalling the fuel pump or fuel controller during repair or replacement. The seal plate assures that leaks are avoided.

4 Claims, 4 Drawing Sheets

AIRCRAFT ENGINE FUEL SYSTEM MOUNTING ASSEMBLY

FIELD OF THE INVENTION

The present invention pertains to a aircraft engine assembly. More particularly, the present invention pertains to an aircraft engine assembly minimizing the number of pipe connections which must be made during assembly, maintenance, and repair of the engine assembly.

Aircraft engine assemblies generally include a number of components such as a fuel pump, a fuel heat exchanger, and a burner or combustor. Many commercial and military aircraft include a fuel controller and an engine control actuator, in addition. It is common practice to connect the combustor, heat exchanger, fuel pump, engine control actuator and fuel controller with individual pipes or tubes. When a component, such as the fuel pump or the fuel controller, must be removed for maintenance or repair, it is necessary to detach each pipe connected to the component. Following reinstallation of the repaired component, each pipe must be reattached, and then the system must be checked for leaks, any leaking pipe connections requiring additional tightening or repair of the connection. This is a time consuming process. In particular, the number of pipe connections which must be made and then checked increases the time required, as well as the expense of engine maintenance and repair. The time requirements can result in prolonged delays in return of the aircraft to service.

The fuel pump and fuel controller are usually mounted on an engine gearbox which provides power to rotate pump. Aircraft engine fuel pumps generally have two sections, a low pressure centrifugal pump for boosting the pressure of the fuel to a low elevated pressure, and a high pressure positive displacement pump for boosting the pressure to a higher level. The boost pump pumps the fuel through a heat exchanger to heat the fuel and provides adequate pressure at the inlet of the high pressure pump to ensure proper operation. The high pressure pump is usually a gear, vane, or axial piston pump and provides the pressure needed to send the fuel to the combustor by way of the fuel controller. The high pressure pump also provides high pressure fuel to operate the engine control actuator, which, for example, might be one or more variable position inlet guide vanes.

The fuel controller receives the high pressure fuel and sends a portion of it to the combustor for burning to power the aircraft. The fuel controller sends another portion of the high pressure fuel to the engine control actuator to operate it. Excess high pressure fuel is recirculated from the fuel controller to the heat exchanger. As a consequence of all this, there a numerous pipe connections involved in removing and reinstalling either the fuel pump or the fuel controller.

SUMMARY OF THE INVENTION

The present invention is an aircraft engine assembly overcoming this problem. An aircraft engine assembly in accordance with a preferred embodiment of the present invention includes an engine which has at least one engine control and a combustion chamber or combustor with a fuel inlet, an engine control actuator for actuating the at least one engine control, a fuel heat exchanger for heating fuel, a fuel controller for controlling the flow of fuel in the aircraft engine assembly, a fuel pump, including a low pressure section for pressurizing the fuel to a low pressure and a high pressure section for pressurizing the fuel to a high pressure, an engine gearbox, and a manifold. The manifold is mounted on the engine gearbox, and the fuel pump and fuel controller are mounted on the manifold. Seal plates are positioned between the fuel pump and the manifold and between the fuel controller and the manifold. The fuel pump shaft passes through the manifold to the engine gearbox which rotates the pump shaft.

The manifold has a plurality of fuel flow paths within it. A first manifold inlet is coupled to an outlet of the fuel pump to receive the low pressure fuel from the fuel pump. This low pressure fuel passes through a first one of the manifold fuel flow paths to a first outlet which is connected to the fuel heat exchanger to provide the low pressure fuel to the heat exchanger for heating. The manifold includes a second inlet coupled to the fuel heat exchanger outlet and coupled by a second one of the fuel flow paths to a manifold second outlet which is coupled to an inlet of the fuel pump to provide the heated fuel to the fuel pump high pressure section. The manifold further includes a third inlet coupled to an outlet of the fuel pump to receive the high pressure fuel and coupled by a third one of the fuel flow paths to a manifold third outlet which is coupled to the fuel controller inlet to provide the high pressure fuel to the fuel controller. A fourth inlet of the manifold is coupled to a combustion fuel outlet of the fuel controller to receive the high pressure combustion fuel and is coupled by a fourth one of the fuel flow paths to a manifold fourth outlet which is coupled to the combustor inlet to supply the combustion fuel to the combustor. A fifth manifold inlet is coupled to a control fuel outlet of the fuel controller and is coupled by a fifth one of the fuel flow paths to a manifold fifth outlet which is coupled to the engine control actuator inlet to supply control fuel to the engine control actuator. A sixth manifold inlet is coupled to the engine control actuator outlet and is coupled to the manifold first outlet to recirculate the control fuel through the heat exchanger after actuation of the engine controls. A seventh manifold inlet is coupled to the fuel controller overflow outlet and to the manifold first outlet to recirculate any overflow fuel through the heat exchanger.

Accordingly, there are no pipe connections to the fuel pump or the fuel controller, other than the fuel pump inlet from the aircraft fuel tank. The seal plates assure fluid tight seals between the fuel pump and fuel controller and the manifold. Therefore, removal and reinstallation of the fuel pump and fuel controller can be accomplished without having to take apart or make pipe connections, and so leaking of pipe connections is not a problem.

BRIEF DESCRIPTION OF THE DRAWINGS

These and other aspects and advantages of the present invention are more apparent from the following detailed description and claims, particularly when considered in conjunction with the accompanying drawings, in which like parts bear like reference numerals. In the drawings:

DETAILED DESCRIPTION

Figure 1:
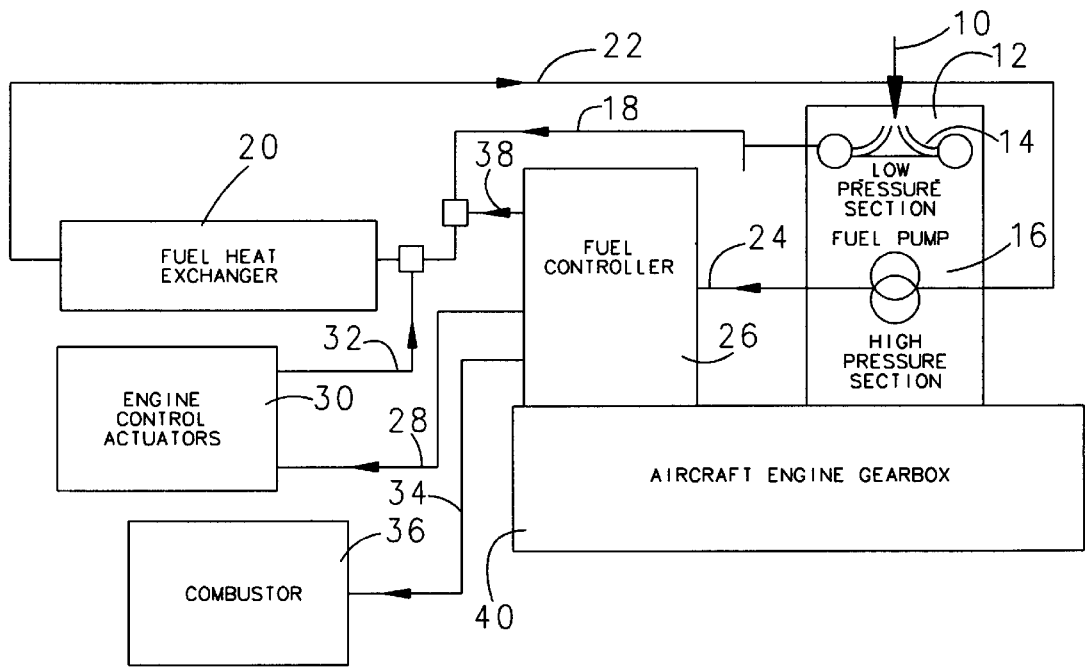
FIG. 1 is a block diagram of a prior art aircraft engine assembly.

FIG. 1 depicts a prior art aircraft engine assembly in which fuel is applied by fuel line 10 from a fuel tank (not shown) to fuel pump 12 which includes a low pressure section 14 and a high pressure section 16. The fuel from fuel line 10 is pressurized by low pressure section 12 and then passes from an outlet of fuel pump 12 through pipe 18 to fuel heat exchanger 20. The heat exchanger heats the fuel to an appropriate temperature for use within the aircraft engine assembly and returns the fuel through pipe 22 to pump 12 where the fuel enters high pressure section 16. High pressure section 16 boosts the fuel to a pressure needed to send the fuel to the remainder of the aircraft engine assembly and pumps the fuel through pipe 24 to fuel controller 26. The fuel controller 26 outputs a portion of the high pressure fuel from a first outlet through pipe 28 to engine control actuators 30 to actuate one or more engine controls. Fuel controller 26 also outputs fuel through pipe 34 to engine combustor 36 to provide fuel for the aircraft operation.

The amount of fuel required by engine control actuators 30 and combustor 36 is dependent upon the particular load being placed on the aircraft engine and its controls at any one time. High pressure pump 16 provides adequate fuel through pipe 24 to fuel controller 26 for the maximum demands of engine control actuators 30 and combustor 36. During times of low engine load, pipe 24 provides more fuel to fuel controller 26 then is required by engine control actuator 30 and combustor 36. Any excess fuel is applied from fuel controller 26 through pipe 38 to pipe 18 which returns that excess fuel through heat exchanger 20 to high pressure pump section 16 by way of pipe 22.

Fuel pump 12 and fuel controller 26 are mounted on aircraft engine gearbox 40. The gearbox 40 provides power to rotate pump 12. Thus, a fuel pump shaft (not shown) enters gearbox 40 in which it makes a connection so that the shaft is driven by the gear box to drive both low pressure section 14 and high pressure section 16 of pump 12.

Fuel pump 12 thus has inlets from pipe 10 and pipe 22 and has outlets to pipe 18 and pipe 24. Fuel controller 26 has an inlet from pipe 24 and has outlets to pipes 28, 34 and 38. When it is necessary to remove fuel pump 12 for maintenance or replacement, its two inlets pipes and two outlet pipes must be disconnected. When the fuel pump is reinstalled, then the two inlet pipes and the two outlet pipes must be reconnected. Similarly, when fuel controller 26 is removed for service or replacement, inlet pipe 24 and outlet pipes 28, 34 and 38 must be disconnected, and when the fuel controller is returned to service, these pipes must be reconnected. Once the pipes are reconnected to either fuel pump 12 or fuel controller 26, each connection must be pressure tested for leaks. Disconnecting and reconnecting the several pipes, and the pressure testing, require a significant amount of time and effort.

Figure 2:
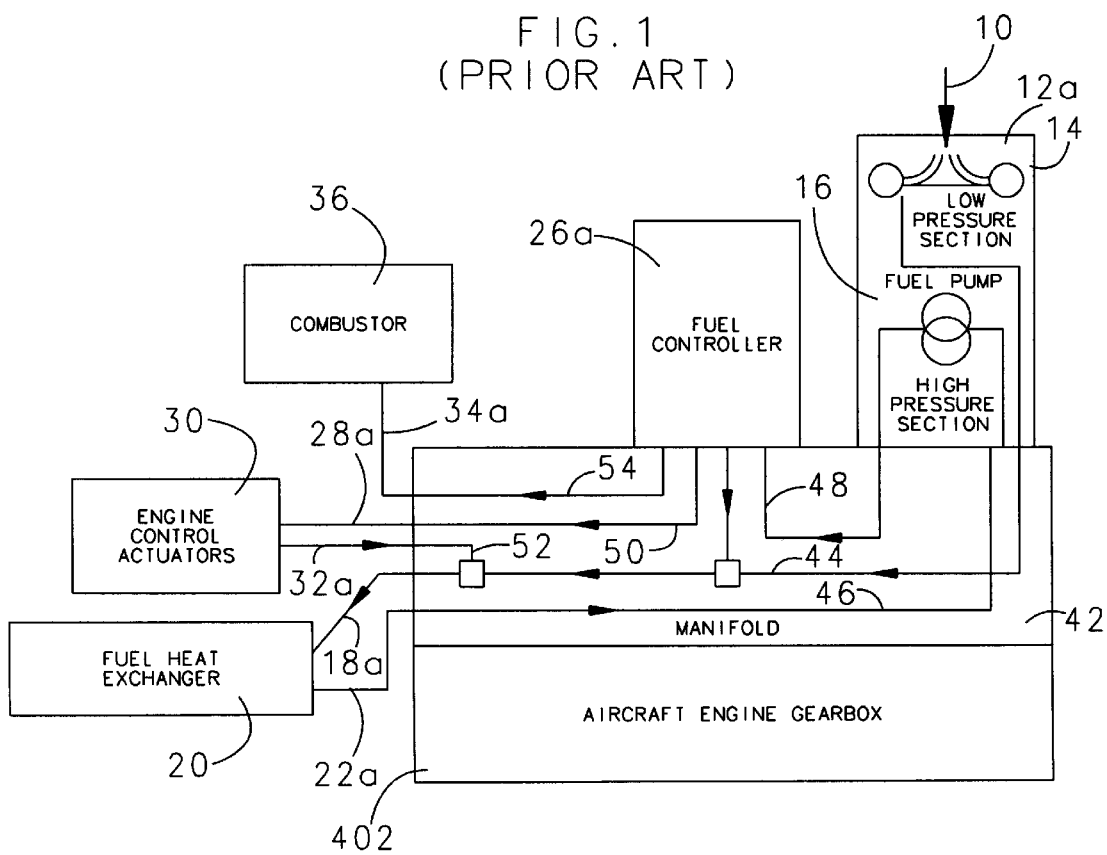
FIG. 2 is a block diagram of a preferred embodiment of an aircraft engine assembly in accordance with the present invention.

FIG. 2 is a block diagram of an improved aircraft engine assembly in accordance with a preferred embodiment of the present invention. The aircraft fuel is applied through pipe 10 from a fuel tank (not shown) to fuel pump 12a which includes a low pressure section 14 and a high pressure section 16. Fuel pump 12a is mounted on manifold 42 which, in turn, is mounted on aircraft engine gearbox 40a. The fuel pump shaft (not shown) passes through manifold 42 into gearbox 40a for driving of pump 12a. The fuel from low pressure section 14 passes from a first outlet of fuel pump 12a through a first inlet of manifold 42 within which the fuel passes through a first fuel flow path 44 and a first outlet of manifold 42 to pipe 18a which supplies the low pressure fuel to fuel heat exchanger 20.

The heated fuel from heat exchanger 20 is applied by pipe 22a to a second inlet of manifold 42 from which the heated fuel passes through a second fuel flow path 46 to a second manifold outlet that is connected to an inlet of fuel pump 12a to supply the heated fuel to high pressure pump section 16. The high pressure fuel from high pressure section 16 passes through a second outlet of fuel pump 12a and a third inlet of manifold 42 to a third fuel flow path 48 within the manifold. Fuel flow path 48 carries the fuel to a third outlet of manifold 42 which is connected to an inlet of fuel controller 26a. The fuel controller 26a passes a portion of the fuel through a fuel controller outlet and a fourth manifold inlet to a fourth fuel flow path 50 within manifold 42. Fourth fuel flow path 50 is connected to a fourth manifold outlet which supplies the fuel through pipe 28a to engine control actuators 30. Pipe 32a brings the fuel from the outlet of engine control actuators 30 to a fifth inlet of manifold 42 from which the fuel passes through fuel flow path 52 to fuel flow path 44 which returns the fuel through pipe 18a, heat exchanger 20, pipe 22a, and fuel flow path 46 within manifold 42 to the high pressure section 16 of pump 12a. Combustion fuel from controller 26a passes through a fuel controller outlet and a sixth inlet of manifold 42 and a fuel flow path 54 within the manifold to a fifth manifold outlet which connects to pipe 34a that supplies the fuel to combustor 36.

As can be seen from FIG. 2, except for inlet pipe 10 there are no pipe connections to fuel pump 12a or fuel controller 26a. When it is necessary to remove fuel pump 12a, the mechanical connections holding the fuel pump onto manifold 42 are removed and the fuel pump itself removed, without having to undo any pipe connections. Similarly, when fuel controller 26a needs to be removed for maintenance or replacement, there are no pipe connections to be detached. Likewise, when fuel pump 12a or fuel controller 26a is replaced, there are no pipe connections to reattached, and no pipe connections to be pressure tested. Although pressure testing of the direct connections between fuel pump 12a and manifold 42 and between fuel controller 26a and manifold 42 is desirable, leaks are less likely to occur, and should a leak occur the leak can be stopped more readily than the prior art which has multiple pipe connections, as discussed below.

Figure 3:
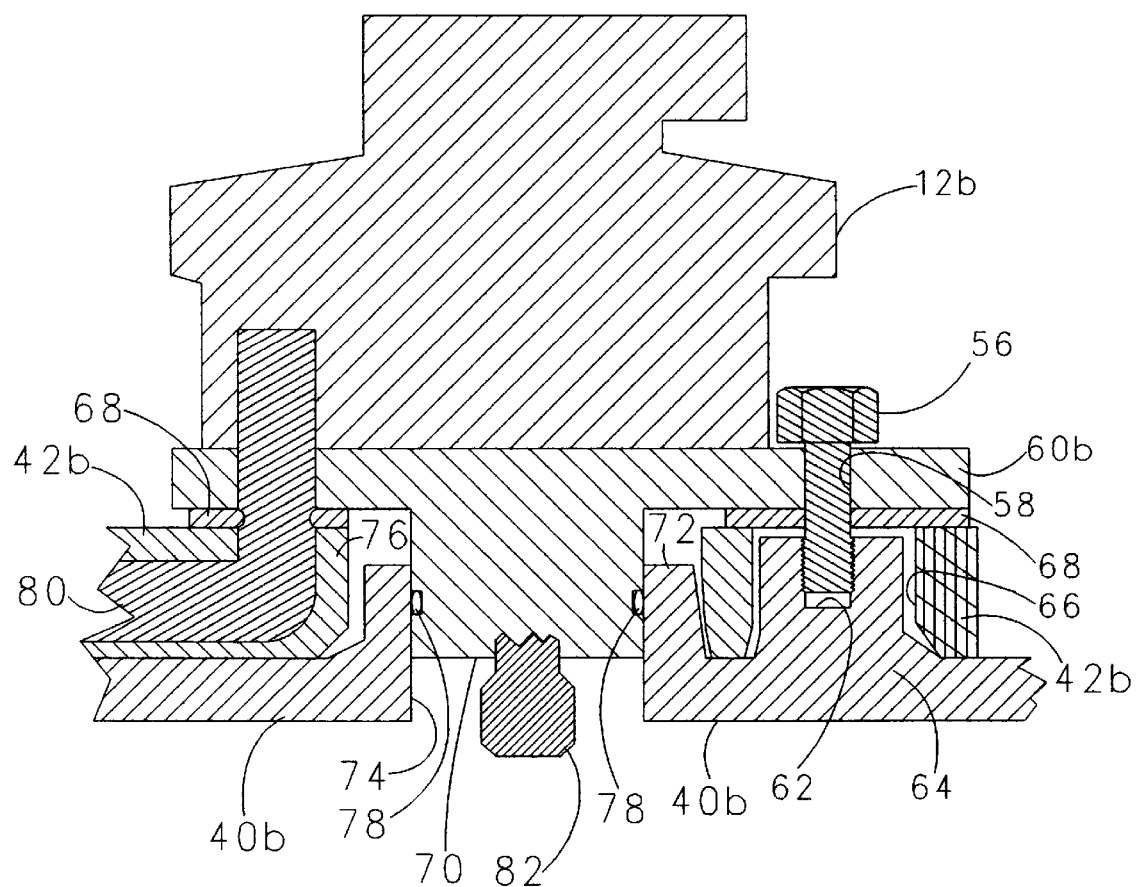
FIG. 3 is a schematic cross-sectional drawing of a preferred embodiment of an aircraft fuel pump, manifold and gearbox suitable for use in the aircraft engine assembly of the present invention.

FIG. 3 is a schematic view of an aircraft engine fuel pump, manifold, and gearbox illustrating components of the type utilized in the present invention. Fuel pump 12b is mounted on manifold 42b which, in turn, is mounted on aircraft engine gearbox 40b. The gearbox includes anchors 64 which extend upwardly through openings 66 in manifold 42b. Fasteners 56, such as bolts, pass through openings 58 in flange 60b of fuel pump 12b and threadidly engage blind openings 62 in anchors 64 of gearbox 40b. A seal plate 68 is positioned between fuel pump 12b and manifold 42b. A pilot receptacle 72 extends upwardly from gearbox 40b through an opening 76 in manifold 42b. A pilot stem 70 extends downwardly from fuel pump 12b to fit snugly within opening 74 in pilot receptacle 72 of gearbox 40b. An O-ring 78 provides a fluid tight seal between pilot stem 70 and pilot receptacle 72 of gearbox 40b to assure that fluids such as lubricating oil do not leak from the assembly. A fuel pipe 80 provides an outlet from fuel pump 12b and an inlet to manifold 42b within which pipe 80 connects to one of the manifold fuel flow paths. Fuel pipe 80 is representative of such inlet/outlet connections. Fuel pump shaft 82 from gear box 40b connects to a drive within fuel pump 12b to rotate the low pressure section and the high pressure section of the fuel pump.

Seal plate 68 may be a stainless steel, aluminum, or other appropriate metal member having annular grooves in its surfaces, with sealing rings in the grooves. Fuel pump 12b is fastened down by a plurality of fasteners 56, only one of which is depicted in FIG. 3, until seal plate 68 is tightly held between fuel pump 12b and manifold 42b, with the annular sealing rings providing a fluid tight seal between fuel pump 12b and manifold 42b. Once the fuel pump 12b is installed, if pressure testing reveals a fuel leak, it likely is due to a component have a defect, such as a scratched surface. Proper pre-assembly inspection can avoid this, but if it does occur the defective component can be replaced by removing fasteners 56 to permit removal and replacement of fuel pump 12b and seal plate 68, as needed. Thus, it is not necessary to tighten numerous pipe connections as in the prior art.

Fuel controller 26a is fastened to manifold 42 in a similar manner, utilizing a seal plate to provide a fluid tight connection without having to interconnect the several pipes.

Figure 4:
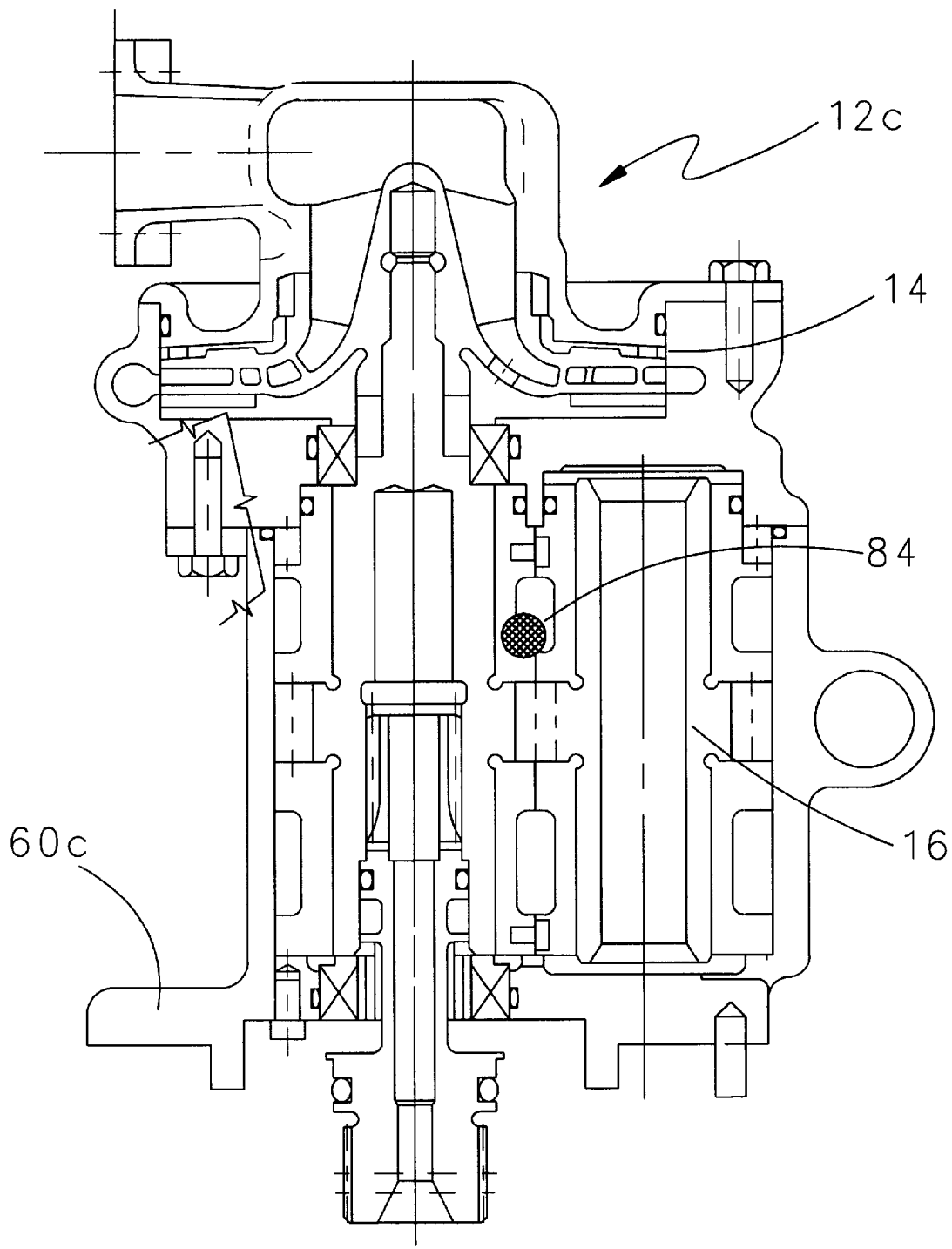
FIG. 4 is a cross-sectional drawing of a prior art aircraft fuel pump.
Figure 5:
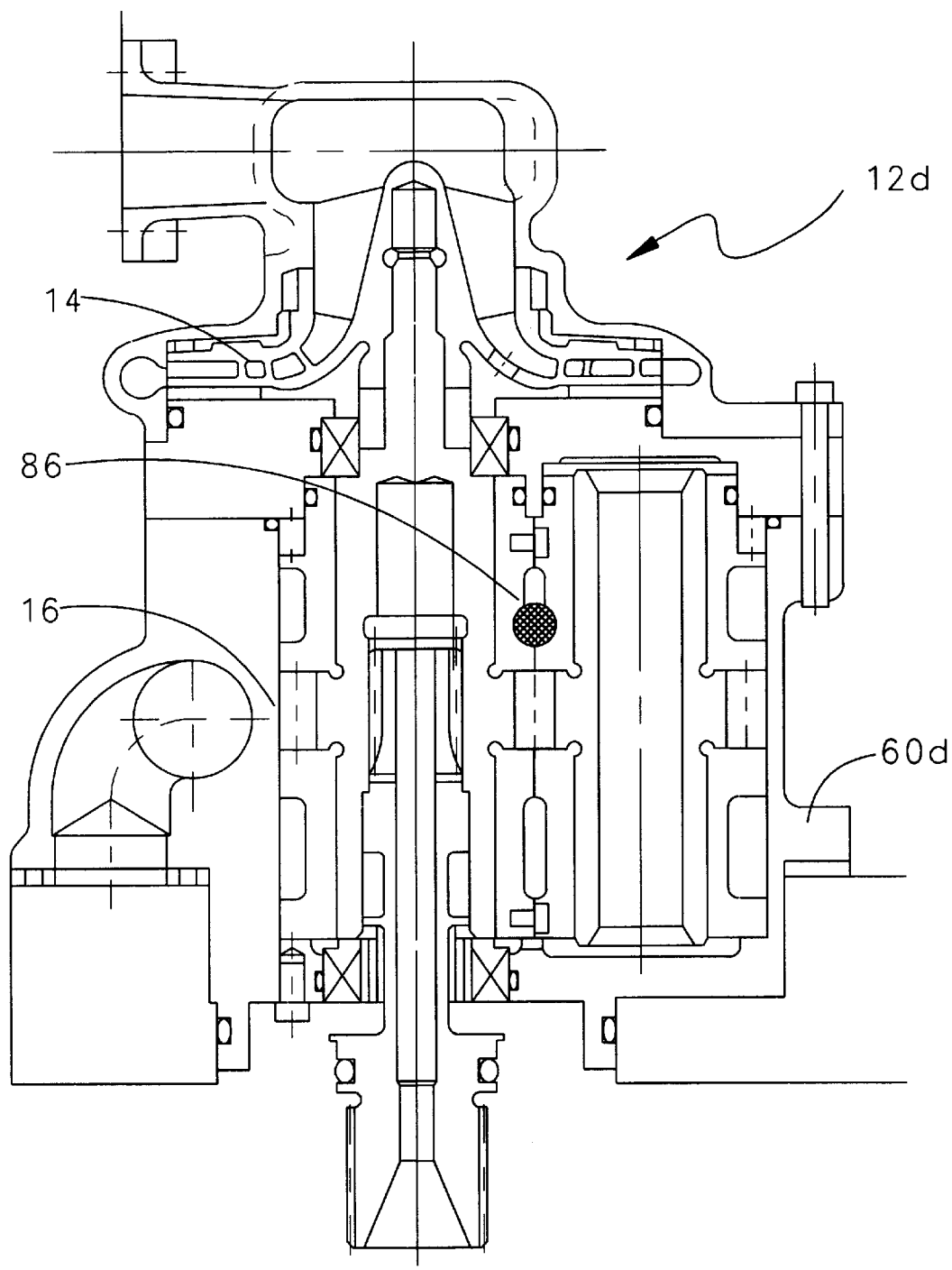
FIG. 5 is a cross-sectional drawing of a preferred embodiment of an aircraft fuel pump suitable for incorporation into an aircraft engine assembly in accordance with the present invention.

In order to accommodate manifold 42 without increasing the overall height of the fuel pump above aircraft engine gearbox 40, the mounting flange of the fuel pump may be raised, as compared to that on a fuel pump mounted directly to the engine gearbox. FIGS. 4 and 5 provide a comparison of this. Thus, FIG. 4 depicts a fuel pump 12c suitable for use in a prior art aircraft engine assembly, such as that of FIG. 1. Fuel pump 12c includes a low pressure section 14 and a high pressure section 16. Fuel pump 12c has a mounting flange 60c to mount the fuel pump onto an aircraft engine gearbox. The center of gravity of fuel pump 12c is approximately at location 84 within fuel pump 12c.

FIG. 5 depicts a fuel pump 12d as might be utilized in an aircraft engine assembly in accordance with the present invention. Fuel pump 12d likewise has a low pressure section 14 and a high pressure section 16. Flange 60d is provided to mount the fuel pump atop the manifold on the aircraft engine gearbox. The center of gravity of fuel pump 12d is illustrated by point 86.

Flange 60d is raised on fuel pump 12d, as compared with flange 60c on fuel pump 12c. Consequently, the center of gravity location 86 in fuel pump 12d is closer to the mounting flange 60d than the center of gravity location 64 in fuel pump 12c is to its mounting flange 60c. This lower center of gravity reduces the overhung moment of the fuel pump, and so reduces stress when the fuel pump is subjected to extreme shock loads that aircraft engine accessories might experience during operation. As a consequence, the pump design margins are improved, and the pump housing can be of a lighter weight, reducing the overall aircraft weight.

It is thus seen that the present invention provides an aircraft engine assembly which minimizes the number of pipe connections, and so permits ready removal and reinstallation of the aircraft fuel pump and fuel controller. Although the present invention has been described with reference to preferred embodiments, various alterations, rearrangements, and substitutions can be made, and still the result will be within the scope of the invention.

What is claimed is:

1. An aircraft engine assembly, comprising:
   an engine, having at least one engine control and having a combustion chamber with a fuel inlet;
   an engine control actuator responsive to flow of high pressure fuel therethrough for actuating said at least one engine control, said engine control actuator having an inlet and an outlet;
   a fuel heat exchanger for heating fuel, said fuel heat exchanger having an inlet and an outlet;
   a fuel controller for controlling flow of fuel in said aircraft engine assembly, said fuel controller having an inlet, a combustion fuel outlet for providing fuel for said combustion chamber, a control fuel outlet for providing control fuel for said engine control actuator, and an overflow fuel outlet for discharging overflow fuel;
   a fuel pump having a pumping shaft, a first inlet for receipt of fuel from a fuel supply, a low pressure section connected to said fuel pump first inlet for receipt of fuel therefrom and responsive to rotation of said pumping shaft to pressurize the fuel to a low pressure, a first outlet for receipt of the low pressure fuel from said low pressure section, a second inlet for receipt of fuel, a high pressure section connected to said fuel pump second inlet for receipt of fuel therefrom and responsive to rotation of said pumping shaft to pressurize the fuel to a high pressure, and a second outlet for receipt of the high pressure fuel from said high pressure section;
   an engine gearbox having a pump drive output;
   a seal plate; and
   a manifold mounted on said engine gearbox and having said fuel pump and said fuel controller mounted thereon, with said seal plate between said fuel pump and fuel controller and said manifold, and with said fuel pump pumping shaft passing through said manifold to said engine gearbox and connected to said engine gearbox pump drive output to rotate said pumping shaft, said manifold having a plurality of fuel flow paths therewithin, and having a manifold first inlet coupled to said fuel pump first outlet for receipt of low pressure fuel therefrom, a manifold first outlet coupled by a first one of said plurality of fuel flow paths to said manifold first inlet and coupled to said fuel heat exchanger inlet to provide the low pressure fuel thereto for heating, a manifold second inlet coupled to said fuel heat exchanger outlet for receipt of heated fuel therefrom, a manifold second outlet coupled by a second one of said plurality of fuel flow paths to said manifold second inlet and coupled to said fuel pump second inlet to provide the heated fuel thereto for supplying to said fuel pump high pressure section, a manifold third inlet coupled to said fuel pump second outlet for receipt of high pressure fuel therefrom, a manifold third outlet coupled by a third one of said plurality of fuel flow paths to said manifold third inlet and coupled to said fuel controller inlet to provide the high pressure fuel thereto, a manifold fourth inlet coupled to said fuel controller combustion fuel outlet for receipt of high pressure combustion fuel therefrom, a manifold fourth outlet coupled by a fourth one of said plurality of fuel flow paths to said manifold fourth inlet and coupled to said combustion chamber fuel inlet to supply the combustion fuel to said combustion chamber, a manifold fifth inlet coupled to said fuel controller control fuel outlet for receipt of high pressure control fuel therefrom, a manifold fifth outlet coupled by a fifth one of said plurality of fuel flow paths to said manifold fifth inlet and coupled to said engine control actuator inlet to supply the control fuel to said engine control actuator, a manifold sixth inlet coupled to said engine control actuator outlet and coupled to said manifold first outlet to provide the control fuel to said fuel heat exchanger inlet after actuation of said at least one engine control, and a manifold seventh inlet coupled to said fuel controller overflow outlet and to said manifold first outlet to provide overflow fuel to said heat exchanger inlet.

2. An aircraft engine assembly, comprising:

an engine, having a combustion chamber with a fuel inlet;

a fuel controller for controlling flow of fuel in said aircraft engine assembly, said fuel controller having an inlet, a combustion fuel outlet for providing fuel for said combustion chamber, and an overflow fuel outlet for discharging overflow fuel;

a fuel pump having a pumping shaft, an inlet for receipt of fuel from a fuel supply, a pressurizing section connected to said fuel pump inlet for receipt of fuel therefrom and responsive to rotation of said pumping shaft to pressurize the fuel, and an outlet for receipt of the pressurized fuel from said pressurizing section;

an engine gearbox having a pump drive output;

a seal plate; and a manifold mounted on said engine gearbox and having said fuel pump and said fuel controller mounted thereon, with said seal plate between said fuel pump and fuel controller and said manifold, and with said fuel pump pumping shaft passing through said manifold to said engine gearbox and connected to said engine gearbox pump drive output to rotate said pumping shaft, said manifold having a plurality of fuel flow paths therewithin, and having a manifold first inlet coupled to said fuel pump outlet for receipt of pressurized fuel therefrom, a manifold first outlet coupled by a first one of said plurality of fuel flow paths to said manifold first inlet and coupled to said fuel controller inlet to provide the pressurized fuel thereto, a manifold second inlet coupled to said fuel controller combustion fuel outlet for receipt of pressurized combustion fuel therefrom, a manifold second outlet coupled by a second one of said plurality of fuel flow paths to said manifold second inlet and coupled to said combustion chamber fuel inlet to supply the combustion fuel to said combustion chamber, a manifold third inlet coupled to said fuel controller overflow fuel outlet for receipt of the overflow fuel therefrom, and a manifold third outlet coupled by a third one of said plurality of fuel flow paths to said manifold third inlet and coupled to said fuel pump second inlet to return overflow fuel to said fuel pump.

3. An aircraft engine assembly as claimed in claim 2, wherein:

said engine further has at least one engine control;

said fuel controller further has a control fuel outlet;

said aircraft engine assembly further comprises an engine control actuator having an inlet and an outlet; and said manifold further has a manifold fourth inlet coupled to said fuel controller control fuel outlet for receipt of control fuel therefrom, a manifold fourth outlet coupled by a fourth one of said fuel flow paths to said manifold fourth inlet and coupled to said engine control actuator inlet to supply the control fuel to said engine control actuator, and a manifold fifth inlet coupled to said engine control actuator outlet and coupled to said manifold third outlet to return the control fuel to said fuel pump.

4. An aircraft engine assembly as claimed in claim 2, wherein:

said aircraft engine assembly further comprises a fuel heat exchanger having an inlet and an outlet; and said manifold further has a manifold fourth inlet coupled to said fuel pump for receipt of fuel therefrom, a manifold fourth outlet coupled by a fourth one of said fuel flow paths to said manifold fourth inlet and coupled to said fuel heat exchanger inlet to supply fuel to said fuel heat exchanger for heating, a manifold fifth inlet coupled to said fuel heat exchanger outlet and coupled to said fuel pump to return the heated fuel to said fuel pump.

* * * * *